April 23, 1957   C. W. MUNDAY   2,790,081
RADIATION ANALYSIS
Filed Jan. 12, 1954   2 Sheets-Sheet 1

INVENTOR.
CHARLES WALTER MUNDAY.
BY Ward, Neal, Haselton,
Orme, & McElhannon
ATTORNEYS.

April 23, 1957  C. W. MUNDAY  2,790,081
RADIATION ANALYSIS
Filed Jan. 12, 1954  2 Sheets-Sheet 2

INVENTOR.
CHARLES WALTER MUNDAY.
BY Ward, Neal, Haselton,
Orme & McElhannon
ATTORNEYS.

2,790,081

RADIATION ANALYSIS

Charles Walter Munday, New Eltham, London, England, assignor to The Distillers Company Limited, Edinburgh, Scotland, a British company Application January 12, 1954, Serial No. 403,479

Claims priority, application Great Britain January 16, 1953

19 Claims. (Cl. 250—43.5)

The present invention relates to an improved construction for an apparatus suitable for the analysis by radiation absorption, and preferably infra-red radiation absorption, of fluids comprising more than one component.

Various types of instruments for the infra-red absorption analysis of gas mixtures are known in the art, and the principle of these instruments depends on the fact that when a beam of infra-read radiation is passed through a mixture of gases, one of the components of which has an absorption band in the infra-red, the energy absorbed is a function of the number of molecules present of the absorbing component, and thus when beams of infra-red radiation are passed through two gas cells, wherein one of the gas cells contains the gas mixture to be analysed and the other gas cell contains a reference gas free from the absorbing component, there will be a difference in the energy content of the beams, which if determined will be a measure of the absorbing component of the gas mixture. One of the best known of the infra-red absorption analysis instruments is the U. R. A. S. analyser which employs a selective detector. In this instrument a beam of pulsating infra-red radiation is passed through an absorption cell containing the gas to be analysed, and then into one side of a detector chamber containing the absorbing component of the gas mixture. A beam of pulsating infra-red radiation is passed through a comparison absorption cell comprising a gold plated glass tube containing a standard gas, and then into the other side of the detector chamber containing the absorbing component of the gas mixture. The two halves of the detector chamber are separated by the diaphragm of a membrane condenser. The absorption of energy only in the absorption cell causes differential heating of the two sides of the detector chamber and this results in a difference in pressure between the gases in the two halves of the chamber. This pressure difference across the diaphragm of the membrane condenser causes a small potential difference to be set up which can be used as a measure of the degree of absorption by the absorbing component of the gas being analysed and therefore of its concentration. The standard gas is a non-absorber in the infra-red such as $O_2, N_2$, air or any other homonuclear diatomic gas.

This apparatus is fully described in B. I. O. S. Final Report No. 1321, pages 67–69, and F. I. A. T. Final Report No. 523 and 586, pages 90–111.

Another type of apparatus for infra-red absorption analysis of gas mixtures is known as the "split beam analyser," which employs an non-selective detector. In this type of analyser a beam of infra-red radiation, is passed through one or more cells containing the requisite gas mixtures, the beam of radiation is split at a suitable point into two equal beams, and the two beams are focussed on one or two sensitive recorders. Such split beam analysers are described by Kivenson in the Journal of the Optical Society of America, February 1950, volume 40, Number 2, pages 112–118.

A similar type of apparatus can be used for the ultra-violet absorption analysis of gases, employing a suitable source of ultra-violet radiation, and suitable windows for the gas chambers and detectors for ultra-violet radiation, for example as described in Kivenson, Osman and Jones in Analytical Chemistry 1949, volume 21, page 769.

It is an object of the present invention to provide an improved apparatus suitable for the analysis of both liquids and gases.

It has been found that variations in intensity of radiation can be measured simply and efficiently by employing the radiation detector hereinafter described.

The invention accordingly comprises the novel apparatus and combinations thereof, specific embodiments of which are described herein by way of example only and in accordance with the manner in which I now prefer to practice the invention.

The present invention is for an improved radiation detector which comprises a rigid frame of a material which is non-ferromagnetic and preferably of slight diamagnetic property on which is rigidly supported a continuous loop consisting of two wires of different metals or alloys which are non-ferromagnetic, joined together at each end forming two thermocouple junctions, each of said junctions being surmounted by and thermally connected to a lamina of a radiation absorbing material, wherein said frame is adapted to be suspended within a cell by a taut suspension means permitting axial rotation of the frame, and said cell is adapted to be positioned between the poles of the magnet. The material from which the frame is constructed is preferably quartz although other materials such as gold, silver, glass, celluloid and like materials which are of slight diamagnetic susceptibility as in the range of specific susceptibilities of $-0.1 \times 10^{-6}$ to $-2 \times 10^{-6}$ cgs. electromagnetic units may also be used. The frame requires to be as light as possible and additionally heat losses from the thermocouple junctions must be avoided. Consequently the frame is preferably an open frame and the continuous loop is supported on fibres stretching between said frame so that no material is in thermal contact with the thermocouple junctions. The cell containing the detector is suitably evacuated thus reducing further possible heat losses. The loop of wire should be of a symmetrical shape with two parallel sides, and for example can be in the form of a square, rectangle or diamond. Optimum efficiency is obtained with a rectangular loop. The loop of wire should be constructed of two materials of as high thermoelectric power as possible and preferably with a slight paramagnetic susceptibility of such magnitude that the combined diamagnetic susceptibility of the frame and the paramagnetic susceptibility of the loop are substantially equivalent thus giving a suspension of effectively zero susceptibility. It has been found suitable to use an open quartz frame and a loop constructed of equal lengths of a palladium-gold alloy and a platinum-iridium alloy, which is supported on quartz fibres stretched between said frame.

In operation, the energy of radiation falling on the lamina is converted into heat which is conducted to the thermocouple junction thus producing a current in the loop. The loop is rigidly mounted on its support and is suspended in a magnetic field and thus the current produced causes an angular rotation of the loop corresponding to the temperature difference between the two laminae. This rotation of the loop may be observed, measured and/or recorded by any of the standard methods.

The present invention also is for a radiation fluid analyzer, particularly an infra-red radiation analyzer, wherein two beams of radiation are employed, characterised in that the beams of radiation are concentrated on to the thermocouple junctions of a radiation detector as described above disposed in a magnetic field.

The analyzer may be used as an "off balance" instrument, that is the motion of the detector may be used directly for indicating purposes, either mechanical or electrical, or alternatively the apparatus may be used as an "on balance" instrument, that is associated with a servo-type of mechanism where the motion of the detector unit is used to operate means which generates a voltage employed to operate means to drive the detector unit back to its balance position, the energy used by said driving means being employed to activate the indicating means.

According to one embodiment of the invention, means are provided to control the motion of the radiation detector, and further to render the apparatus self-balancing and to maintain the position of the radiation detector substantially constant. Such means suitably comprise a length or coil of wire which encircles at least once and is rigidly fixed to said radiation detector in a coil, said coil lying substantially in the same plane as the continuous loop of the detector, the ends of the coil being taken to separate electrical connections. This coil should not of course short at any position, and naturally needs to be insulated from the frame if the latter is a conductor. The ends of the coil may be taken from any position of said frame although conveniently one end of the coil is taken from the top and the other from the bottom of said frame. Suitably also where the suspension means comprise metallic strips which are insulated from the frame, these suspension strips may be used to make the electrical connections. The motion of the radiation detector may be controlled by the injection of a suitable current through this coil to be determined manually or otherwise. According to a preferred embodiment of the invention, the apparatus is rendered self-balancing by applying to the said length of wire the output from a feed back amplifier associated with said radiation detector. According to this embodiment of the invention one form which the apparatus may take is where the radiation analysis apparatus includes a radiation detector which comprises a frame of a material of slight diamagnetic property on which is rigidly supported a substantially uniplanar continuous loop consisting of two wires of different alloys joined together at each end forming two thermocouple junctions, each of said junctions being surmounted by and thermally connected to a lamina of a radiation absorbing material, said frame being encircled by a coil of wire rigidly fixed to said radiation detector, said coil lying substantially in the same plane as said continuous loop of wire, the ends of the coil being taken to separate electrical connections, wherein said frame is suspended on a fibre rigidly supported at both ends within a cell positioned between the poles of a magnet, said frame or its suspension means carrying a mirror, a light spot adapted to be reflected by said mirror on to a photo-electric system, electrical means to amplify the output from said photo-electric cell system, indicating or recording means operated from said output, and means to apply said output to the electrical connections attached to the two ends of said length of wire to induce a moment equal and opposite to that acting on said test body.

Motion of the detector and attached mirror and consequent motion of the light spot leads to the generation of a voltage at the photocell which can be appropriately amplified and rectified and employed to supply current to the single coil of wire round the quartz frame thus imparting a moment of force to the detector, counteracting the moment of force generated at the loop of wire. In this way the detector can be maintained oscillating in its balance position. The current supplied to the outer single coil of wire may be used to actuate appropriate indicating means.

In order to describe the invention more fully modifications of the invention are shown diagrammatically in the accompanying drawings, solely by way of illustration.

Figure 1:
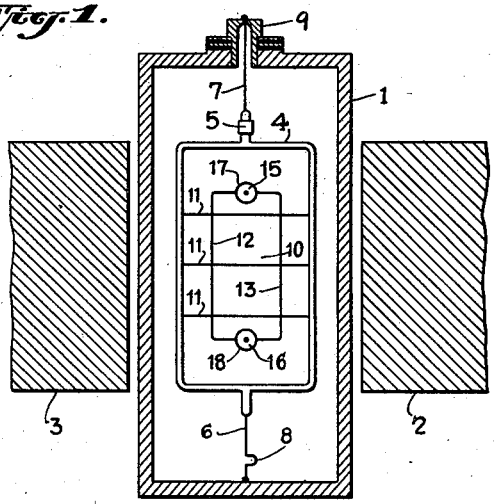
Figure 1 is a cross-sectional view of a radiation detector mounted in position for use.

In Figure 1 the cell 1, suitably constructed of brass, is positioned between the magnet poles 2 and 3. The cell 1 contains the quartz frame 4 carrying the mirror 5 and supported by quartz fibres 6 and 7. The suspension fibre 6 is connected to the spring 8 which is mounted on the wall of the cell 1. The suspension fibre 7 is connected to the torsion support 9 which is mounted on the opposite wall of the cell 1. The suspension fibre is suitably a metal suspension strip, such as a gold strip, or a quartz fibre. The quartz frame 4 supports the loop of wire 10 by means of the rigid quartz fibres 11 which are cemented to both the frame 4 and the wire 10 forming a framework which maintains the wire 10 rigid with respect to the frame 4. The loop of wire comprises the wire 12 made of one alloy, and the wire 13 made of another alloy, the two alloys being such that their junction forms a thermocouple. Suitably one alloy is a palladium/gold alloy and the other is a platinum/iridium alloy. At the junctions 15 and 16 of the alloys are thermally connected discs or laminae 17 and 18 of a radiation absorbing material, such as gold foil covered with gold black. For maximum efficiency the long parallel sides of the wires 12 and 13 are at right angles to the lines of force in the magnetic field.

In operation one of the beams of radiation is concentrated on to the lamina 17 and the other beam of radiation is concentrated on to the laminae 18. Where the energy level of the two beams is the same the two laminae are heated to the same temperature and consequently no current is produced in the loop. Where the energy levels of the two beams are different the two laminae are heated to different temperatures with consequent production of current in the loop. The magnitude of the current is dependent on the temperature difference between the two laminae. The current produced causes the loop to move in the magnetic field in a direction at right angles to the lines of force, the extent of the movement being related to the current produced and consequently to the difference in energy level between the two beams. The movement of the loop and quartz support is conveniently measured by observing or recording the movement of a light spot reflected by the mirror 5.

The cell is suitably evacuated in order to obviate convection currents around the detector unit. The detector unit needs to be shielded from all radiation except that which it is desired to detect.

Figure 2:
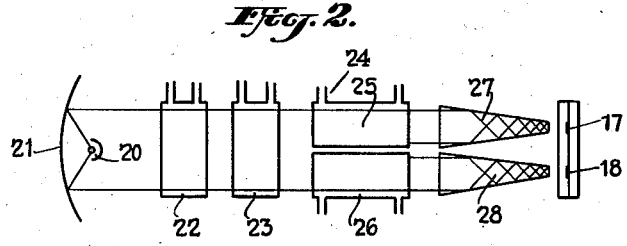
Figure 2 is a diagrammatic layout plan of an infra-red analyzer using a double detector according to the invention.

Figure 2 shows an infra-red radiation analyser wherein radiation from the source 20 is reflected by concave mirror 21 to give a beam of radiation. This beam of radiation passes into the analysis gas absorption cell 22 containing the gas mixture to be analysed and then through the filter cell 23. The beam of radiation is then divided by the cell unit 24, which consists of half cell 25 and half cell 26, into two equal beams of radiation. One beam passes through half cell 25 and is concentrated by funnel 27 on to the disc 17 of the detector as shown in Figure 1. The other beam of radiation passes through cell 26 and is concentrated by funnel 28 on to the disc 18 of the detector as shown in Figure 1.

The funnels 27 and 28 are suitably made of glass or quartz, the interiors of the funnels being coated with a reflecting film and the funnel being constructed according to known optical principles to reduce the dimensions of the beam of radiation.

Figure 3:
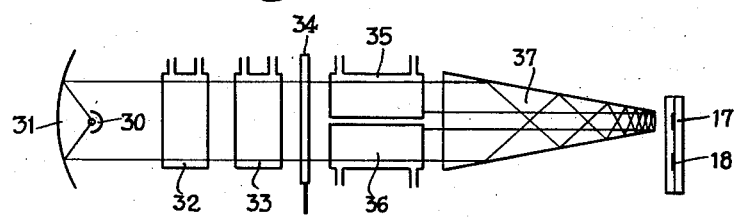
Figure 3 is a diagrammatic layout plan of an infra-red analyzer using a single detector.

Figure 3 shows an alternative form of an infra-red analyser wherein radiation from the source 30 is reflected by concave mirror 31 to give a beam of radiation. This beam of radiation passes into the analysis gas absorption cell 32 containing the gas mixture to be analysed and then through the filter cell 33. The beam of radiation is then divided into two equal alternately interrupted beams of radiation by the rotating interrupter 34 and one of said beams passes through the half cell 35 and is concentrated by the funnel 37 on to the disc 17 of a radiation detector as shown in Figure 1 whilst the other of said beams passes through the half cell 36 and is also concentrated by the funnel 37 on to the disc 17. In the operation of this form of infra-red analyser the detector responds to the difference in the energy levels in the two beams; where the energy of the two beams is the same the temperature of the disc 17 will be constant and the detector unit will not rotate; where the energy of the two beams is different the temperature of the disc will vary at a frequency corresponding to the rate of interruption of the two beams and the detector will oscillate accordingly. Detection of the oscillation of the detector can be achieved with a light spot and a mirror and will give a measure of the difference in energy levels in the two beams of radiation. The second of the discs 18 does not receive radiation from the beams of radiation in the analyser and acts as a compensator. If desired radiation from a source may be directed on to this disc in order to bring it to a temperature approximately equal to the average temperature of the disc 17.

In this form of the apparatus as shown in Figure 3, if so desired, fluctuations of the radiation source may be compensated by arranging for part of the radiation to fall directly on the second of the thermocouple junctions, without passing through any variable gases. It will be appreciated that in this and other ways fluctuations of the radiation source may be compensated.

Figure 4:
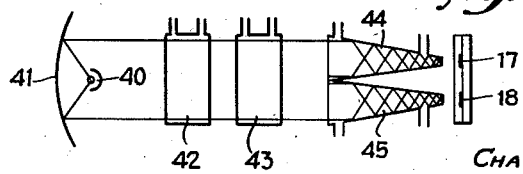
Figure 4 is a diagrammatic layout plan of an infra-red analyzer using a double detector.

Figure 4 shows an infra-red radiation analyser similar to that shown in Figure 2, wherein the terminal cells are funnel shaped to avoid the need to use separate funnels. Radiation from the source 40 is reflected by concave mirror 41 to give a beam of radiation. This beam of radiation passes into the analysis gas absorption cell 42 containing the gas mixture to be analysed and then through the filter cell 43. The beam of radiation is then divided into two by the twin cells 44 and 45, one beam passing through cell 44 and on to detector 17 and the other beam passing through cell 45 and on to detector 18. The twin cells 44 and 45 are suitably made of glass or quartz and the interiors of the cells are coated with a reflecting film. The funnel construction of these cells is analogous to that of the funnels in Figure 2.

Figure 5:
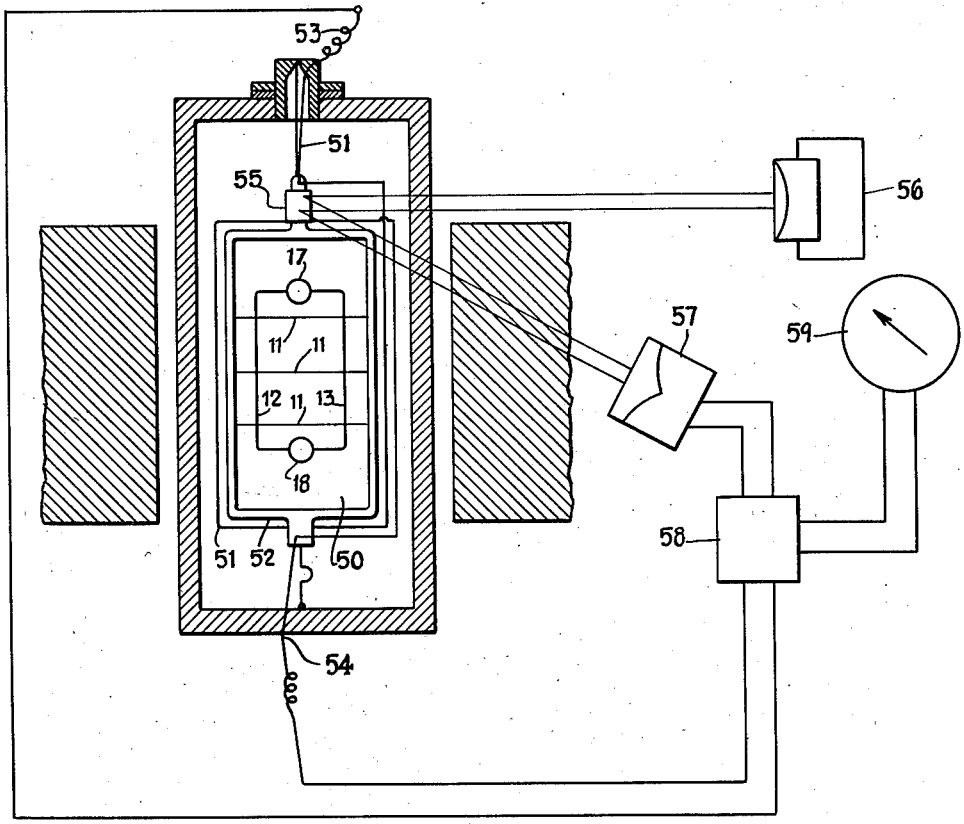
Figure 5 is a cross-section of the radiation detector of an infra-red analyzer together with a block diagram of the associated servo-mechanism.

Figure 5 is a cross-section of the radiation detector of an infra-red analyser together with a block diagram of the associated servo-mechanism. The radiation detector 50 is of the same construction as that shown in Figure 1, with the exception that the frame 52 is encircled by the coil of wire 51, the ends of the coil being taken to connections 53 and 54. The coil of wire 51 is arranged so that no two parts of said wire are in electrical contact except through the length of wire, and is attached to the frame by suitable means. The mirror 55 is cemented to the frame as previously shown. A light source 56 provides a beam of light reflected by the mirror 55 on to a photocell unit 57. Motion of the frame, and mirror, generates current at the photocell unit which is modified and amplified by means 58, the current being applied to the ends of the coil 51 as shown, and in such a direction as to tend to return the test body to its balance position. The output from the photocell unit is measured, or recorded by suitable means 59 which thereby indicates the extent of the moment acting on the test body, and thus of the composition of the material undergoing test.

The radiation analyser may be operated according to the usual methods employed for radiation analysers. Suitably for instance the radiation detector of the invention may be employed in radiation analysers as described in our copending U. S. application Ser. No. 177,890 filed 5th August, 1950, now Patent No. 2,741,703.

The measurement of the movement of the detector is suitably effected by employing a mirror attached to the detector and a light spot, and recording the movement of the light spot as described in our copending U. S. application Ser. No. 201,552 filed 19th December, 1950, now abandoned.

I claim:

1. A radiation detector which comprises a cell, a rigid frame, a continuous loop consisting of two wires of different metals joined together at each end forming two thermocouple junctions, two laminae of radiation absorbing material, wherein the continuous loop is rigidly supported on said rigid frame, each of the thermocouple junctions being surmounted by and thermally connected to a lamina of radiation absorbing material, the said frame being adapted to be suspended within the cell by a taut suspension means permitting axial rotation of the frame, the cell being adapted to be positioned between the poles of a magnet.

2. A radiation detector as claimed in claim 1 wherein the rigid frame is of minimum weight.

3. A radiation detector as claimed in claim 1 wherein the rigid frame comprises an open frame and the continuous loop is supported on fibres stretching between the extremities of said frame.

4. A radiation detector as claimed in claim 1 wherein the rigid frame is constructed of a material of diamagnetic specific susceptibility of the order of about $-0.1 \times 10^{-6}$ to $-2 \times 10^{-6}$ cgs. electromagnetic units at room temperature.

5. A radiation detector as claimed in claim 1 wherein the rigid frame is constructed of quartz and the continuous loop is mounted on quartz fibres rigidly fixed at each end to said frame.

6. A radiation detector as claimed in claim 1 wherein the continuous loop and junctions are symmetrical.

7. A radiation detector as claimed in claim 1 wherein the loop has two parallel sides.

8. A radiation detector as claimed in claim 1 wherein the loop is a rectangular loop and the two junctions are disposed in centres of the two shorter sides thereof.

9. A radiation detector as claimed in claim 1 wherein the loop is constructed of equal lengths of a palladium gold alloy and a platinum-iridium alloy.

10. A radiation detector which comprises a cell, a rigid frame consisting of a material of slight diamagnetic susceptibility, a continuous loop consisting of two wires of different metals joined together at each end forming two thermocouple junctions, the paramagnetic susceptibility of the loop being substantially equivalent to the diamagnetic susceptibility of the frame, two laminae of radiation absorbing material, wherein the continuous loop is rigidly suported on said rigid frame, each of the thermocouple junctions being surmounted by and thermally connected to a lamina of radiation absorbing material, the said frame being adapted to be suspended within the cell by a taut suspension means permitting axial rotation of the frame, the cell being adapted to be positioned between the poles of a magnet.

11. A radiation detector which comprises a cell, a rigid frame constructed of quartz, a continuous loop constructed of equal lengths of a palladium-gold alloy and a platinum-iridium alloy joined together at each end forming two thermocouple junctions, two laminae of radiation absorbing material, wherein the continuous loop is mounted on quartz fibres rigidly fixed at each end to said quartz frame, each of the thermocouple junctions being surmounted by and thermally connected to a lamina of radiation absorbing material, the said frame adapted to be suspended within the cell by a taut suspension means permitting axial rotation of the frame, the cell being adapted to be positioned between the poles of a magnet.

12. A radiation detector which comprises a cell, a rigid frame, a continuous loop of two wires of different metals joined together at each end forming two thermocouple junctions, two laminae of radiation absorbing material, and a coil of wire wherein the continuous loop is rigidly supported on said rigid frame, each of the thermocouple junctions being surmounted by and thermally connected to a lamina of radiation absorbing material, the coil of wire encircling at least once and being rigidly fixed to the rigid frame, the said coil lying in substantially the same plane as the continuous loop of the detector, each end of said coil of wire being taken to separate connections, the said frame being adapted to be suspended within the cell by a taut suspension means permitting axial rotation of the frame, the cell being adapted to be positioned between the poles of the magnet.

13. A radiation analyser which comprises a source of radiation, analysis cells and a radiation detector, wherein said radiation detector consists of a cell, a rigid frame, a continuous loop consisting of two wires of different metals joined together at each end forming two thermocouple junctions, two laminae of radiation absorbing material, wherein the continuous loop is rigidly supported on said rigid frame, each of the thermocouple junctions being surmounted by and thermally connected to a lamina of radiation absorbing material, the said frame being adapted to be suspended within the cell by a taut suspension means permitting axial rotation of the frame, the cell being adapted to be positioned between the poles of a magnet, means for passing the radiation through said analysis cells, means for concentrating the radiation on to at least one of the thermocouple junctions of said detector, and means for recording the movement of said radiation detector.

14. An infra-red radiation analyser which comprises a source of radiation, an analysis absorption cell, a filter cell, a twin cell unit and a radiation detector, wherein said radiation detector consists of a cell, a rigid frame, a continuous loop consisting of two wires of different metals joined together at each end forming two thermocouple junctions, two laminae of radiation absorbing material, wherein the continuous loop is rigidly supported on said rigid frame, each of the thermocouple junctions being surmounted by and thermally connected to a lamina of radiation absorbing material, the said frame being adapted to be suspended within the cell by a taut suspension means permitting axial rotation of the frame, the cell being adapted to be positioned between the poles of a magnet, wherein said twin cell unit equally divides the radiation, half of the radiation passing through one cell of said unit and then through concentrating means on to one thermocouple junction of said detector, and half of the radiation passing through the other cell of said unit and then through concentrating means on to the other thermocouple junction of said detector, and means for observing or recording the movement of said radiation detector.

15. An infra-red radiation analyser as claimed in claim 14 wherein said radiation detector consists of a cell, a rigid frame consisting of a material of slight diamagnetic susceptibility, a continuous loop consisting of two wires of different metals joined together at each end forming two thermocouple junctions, the paramagnetic susceptibility of the loop being substantially equivalent to the diamagnetic susceptibility of the frame, two laminae of radiation absorbing material, wherein the continuous loop is rigidly supported on said rigid frame, each of the thermocouple junctions being surmounted by and thermally connected to a lamina of radiation absorbing material, the said frame being adapted to be suspended within the cell by a taut suspension means permitting axial rotation of the frame, the cell being adapted to be positioned between the poles of a magnet.

16. An infra-red radiation analyser which comprises a source of radiation, an analysis absorption cell, a filter cell, a twin cell unit and a radiation detector, wherein said radiation detector consists of a cell, a rigid frame, a continuous loop consisting of two wires of different metals joined together at each end forming two thermocouple junctions, two laminae of radiation absorbing material, wherein the continuous loop is rigidly supported on said rigid frame, each of the thermocouple junctions being surmounted by and thermally connected to a lamina of radiation absorbing material, the said frame being adapted to be suspended within the cell by a taut suspension means permitting axial rotation of the frame, the cell being adapted to be positioned between the poles of a magnet, wherein said twin cell unit equally divides the radiation, half of the radiation passing through one cell of said unit and on to one thermocouple junction of said detector, and half of the radiation passing through the other cell of said unit and on to the other thermocouple junction of said detector, the cells of said twin cell unit being funnel shaped to effect concentration of the radiation, and means for observing or recording the movement of said radiation detector.

17. An infra-red radiation analyser as claimed in claim 16 wherein said radiation detector consists of a cell, a rigid frame consisting of a material of slight diamagnetic susceptibility, a continuous loop consisting of two wires of different metals joined together at each end forming two thermocouple junctions, the paramagnetic susceptibility of the loop being substantially equivalent to the diamagnetic susceptibility of the frame, two laminae of radiation absorbing material, wherein the continuous loop is rigidly supported on said rigid frame, each of the thermocouple junctions being surmounted by and thermally connected to a lamina of radiation absorbing material, the said frame being adapted to be suspended within the cell by a taut suspension means permitting axial rotation of the frame, the cell being adapted to be positioned between the poles of a magnet.

18. An infra-red radiation analyser which comprises a source of radiation, an analysis absorption cell, a filter cell, a radiation interrupter, a twin cell unit, a radiation detector, wherein said radiation detector consists of a cell, a rigid frame, a continuous loop consisting of two wires of different metals joined together at each end forming two themocouple junctions, two laminae of radiation absorbing material, wherein the continuous loop is rigidly supported on said rigid frame, each of the thermocuple junctions being surmounted by and thermally connected to a lamina of radiation absorbing material, the said frame being adapted to be suspended within the cell by a taut suspension means permitting axial rotation of the frame, the cell being adapted to be positioned between the poles of a magnet, means for concentrating the radiation on to one of the thermocouple junctions of said detector, and means for observing or recording the movement of said radiation detector, wherein the radiation interrupter divides and interrupts the radiation, half the radiation passing through one cell of said twin unit and half of the radiation passing through the other cell of said twin unit.

19. A radiation analyser as clamed in claim 18 wherein the radiation detector consists of a cell, a rigid frame consisting of a material of slight diamagnetic susceptibility, a continuous loop consisting of two wires of different metals joined together at each end forming two thermocouple junctions, the paramagnetic susceptibility of the loop being substantially equivalent to the diamagnetic susceptibility of the frame, two laminae of radiation absorbing material, wherein the continuous loop is rigidly supported on said rigid frame, each of the thermocouple junctions being surmounted by and thermally connected to a lamina of radiation absorbing material, the said frame being adapted to be suspended within the cell by a taut suspension means permitting axial rotation of the frame, the cell being adapted to be positioned between the poles of a magnet.

References Cited in the file of this patent

UNITED STATES PATENTS

| | | |
|---|---|---|
| 2,563,931 | Harrison | Aug. 14, 1951 |
| 2,605,426 | Martin | July 29, 1952 |
| 2,648,775 | Waters | Aug. 11, 1953 |
| 2,653,178 | Ruffle | Sept. 22, 1953 |